Nov. 25, 1924.

C. M. SMITH

CUSHIONED HORSESHOE

Filed Sept. 2, 1922

1,516,508

Inventor,
Cora M. Smith,
by Geyer Popp
Attorneys.

Patented Nov. 25, 1924.

1,516,508

UNITED STATES PATENT OFFICE.

CORA M. SMITH, OF BUFFALO, NEW YORK.

CUSHIONED HORSESHOE.

Application filed September 2, 1922. Serial No. 585,982.

*To all whom it may concern:*

Be it known that I, CORA M. SMITH, a citizen of the United States, residing at Buffalo, in the county of Erie and State of New York, have invented new and useful Improvements in Cushioned Horseshoes, of which the following is a specification.

This invention relates to an anti-slipping horseshoe having a hardened calk-member separate from the shoe proper, and more particularly to a cushioned shoe of this character.

Its object is to produce an inexpensive shoe of this kind which is light and yet strong and durable in construction, which can be adjusted by expansion and contraction within certain limits to fit hoofs of different sizes, and which assures the horse a good foothold and reduces slipping to a minimum.

Figure 1:
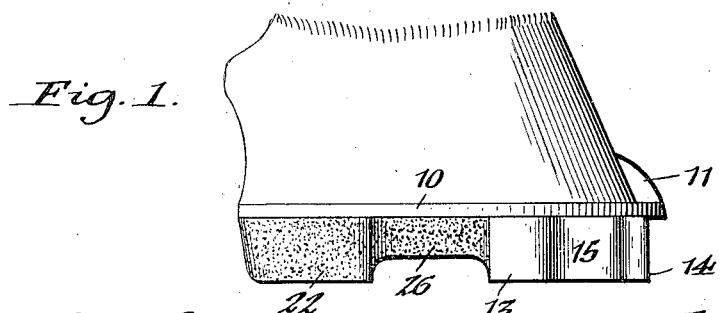
Figure 2:
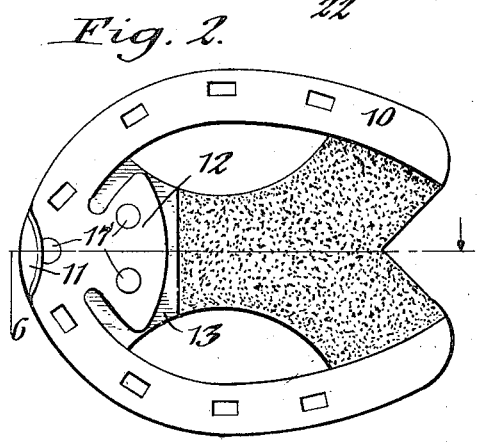
Figure 3:
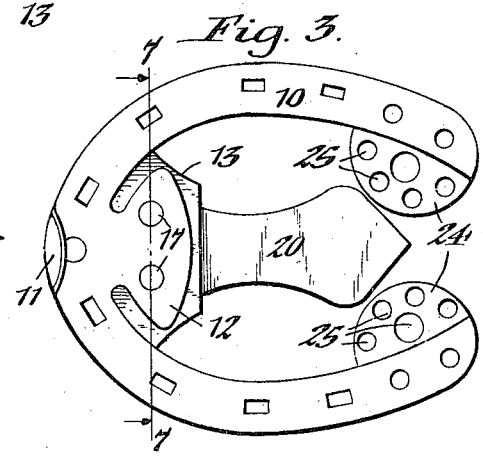
Figure 4:
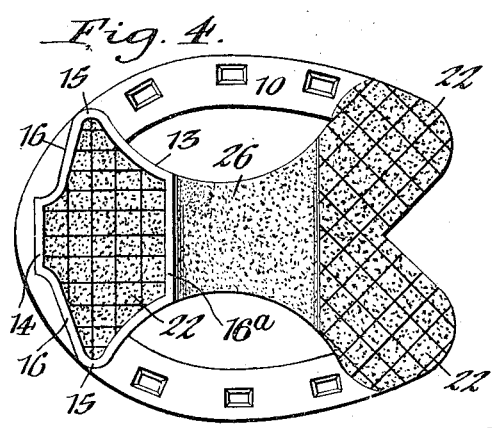
Figure 5:
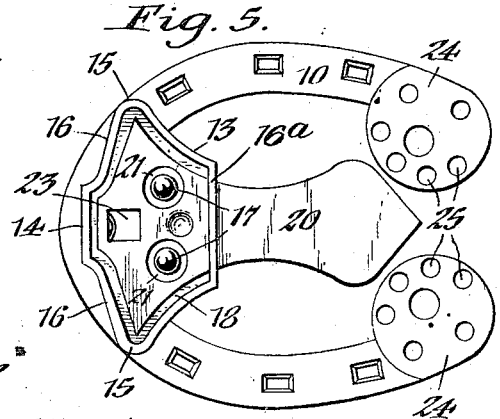
Figure 6:
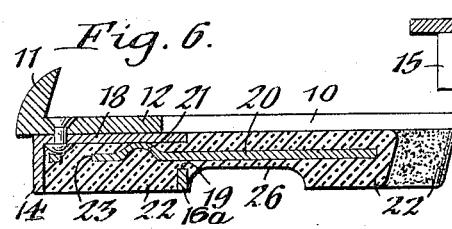
Figure 7:
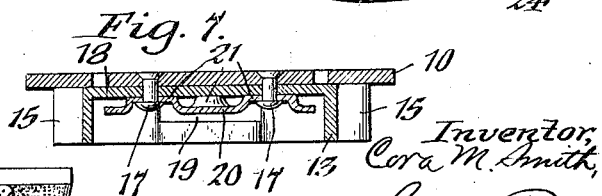

In the accompanying drawings:

Figure 1 is a side elevation of the improved horseshoe applied to the animal's hoof; Fig. 2 is a detached top plan view thereof; Fig. 3 is a view similar to Fig. 2, with the cushioning pad removed; Fig. 4 is a bottom plan view of the complete shoe; Fig. 5 is a similar view, but showing the cushioning pad removed; Fig. 6 is a longitudinal section on line 6—6, Fig. 2; and Fig. 7 is a transverse section on line 7—7, Fig. 3.

Similar characters of reference indicate corresponding parts throughout the several views.

10 indicates a horseshoe of the usual outline fastened to the animal's hoof by ordinary horseshoe nails and having the customary toe clip 11. Projecting rearwardly from the front or toe portion of the horseshoe and located substantially in the plane thereof is a lug or bracket 12 which may be of substantially dovetail form, as shown in Figs. 2 and 3. The side edges of said bracket are spaced or disconnected from the adjacent inner edges of the horseshoe, so that the side portions of the latter can be expanded and contracted relatively to the bracket to fit the hoofs of different sizes within certain limits.

Applied to the underside of the front portion of the horseshoe is a hardened hollow or box-like calk-member 13 having a comparatively narrow front salient portion 14 forming the toe-calk of the shoe, and substantially V-shaped salient side portions 15 which form non-slipping side calks. Said front calk is braced at its ends by the forwardly-converging wall-portions 16 of the calk-member which are joined at their rear ends to the side calks 15. The rear walls of the side calks extend inwardly beyond the inner edge of the horseshoe as shown, and are connected at their rear ends by the transverse rear wall 16ª of the calk structure.

This arrangement produces a very strong and rigid construction, not liable to be bent out of shape under impact, thus insuring the animal a good foothold on the pavement and guarding against slipping.

The calk member may be secured to the bracket 12 of the horseshoe by rivets 17 or or other appropriate fastenings passing through the top plate 18 of the calk-member. As shown in Figs. 6 and 7, the rear wall of the calk-member is provided adjacent to its top plate with an opening 19 for a purpose hereinafter described.

Fastened at its front end to the calk-member 13 is a reinforcing tongue or plate 20 which extends lengthwise of the shoe and terminates near its heel portions, the rear end of the tongue being free and disconnected from the heel portions, as shown in Figs. 3 and 5, to allow them to be expanded or contracted to fit different-sized hoofs. This tongue is fastened to the front part of the shoe by the rivets 17, or other suitable means, and it extends rearwardly through the opening 19 in the rear wall of the calk-member 13. As shown in Figs. 6 and 7, the front end of the tongue 20 is provided on its upper side with bosses or projections 21, whereby the same is spaced from the top plate 18 of the calk-member.

To absorb the shocks and jars incident to the travel of the animal over hard pavements and also to prevent slipping, the hollow calk member and heel portions of the shoe are provided with rubber pads or cushions 22 which are molded in said member and about the tongue 20 at said heel portions, the toe pad being anchored in the intervening space formed between said tongue and the top plate of the calk member and also in an aperture 23 in the tongue. In order to reliably anchor the cushion to the heel portions of the shoe, the latter may be provided with substantially circular enlargements 24 having openings 25 for the passage of the rubber. As shown in Fig. 6, the toe and heel cushions are preferably substantially flush with the lower edge of the calk member, while the intervening rubber portion 26 between these cushions is recessed or raised above the surface of the toe and heel cushions.

The hollow calk member 13 is practically self-sharpening, and its projecting front and side portions 14, 15, effectively prevent rearward and side slipping, while the cushioned pads relieve the animal from jars upon hard pavements as well as aid in preventing slipping.

It will be noted that the calk member is fastened only to the dovetail bracket 12 of the shoe, the ends thereof which underlie the contiguous side portions of the shoe, being disconnected to permit the expansion and contraction of the shoe for fitting it to hoofs of different sizes, as hereinbefore described.

The tongue backs and stiffens the portion of the rubber pad between its toe and heel portions.

While furnishing a cushioned shoe of great strength in comparison with its weight, the improvement comprises comparatively few parts and can be produced at a correspondingly low cost.

I claim as my invention:

1. A horseshoe, having a bracket projecting rearwardly from its front portion, the sides of the bracket being disconnected from the opposing edges of the shoe, and a calk-member attached to said bracket and overlapping the side portions of the shoe.

2. A horseshoe, having a bracket projecting rearwardly from the front portion thereof, said bracket having its side edges spaced from the opposing inner edges of the shoe, a calk-member underlying said bracket and the adjacent front and side portions of said shoe, and means for fastening said calk-member to the bracket, those ends of the calk-member extending under the side portions of the shoe being detached therefrom to permit expansion and contraction of the shoe relative to said bracket and said calk-member.

3. A horseshoe having a hollow calk-member, comprising substantially V-shaped side calks, a relatively narrow front calk arranged forward of said side calks, the front walls of said side calks converging forwardly and bracing the ends of the front calk, the rear walls of the side calks extending inwardly beyond the inner edge of the horseshoe, and a transverse rear wall connecting the rear ends of said rear walls.

4. A horseshoe having a hollow box-like calk-member attached to the underside of its toe portion, said calk-member being closed at its top by a plate, a reinforcing tongue having its front portion secured within said calk-member and spaced from said top-plate, the rear end of said tongue being detached from the heel portions of the shoe to permit expansion and contraction of the latter; and a cushioning pad applied to said hollow calk-member, said tongue, and the heel portions of the shoe.

5. A horseshoe, having a bracket projecting rearwardly from its front part, a hollow calk-member applied to said bracket, a tongue arranged lengthwise of the shoe and connected at its front end to said calk-member and terminating short of the rear heel portions of the shoe, the front portion of said tongue being provided with bosses for spacing it from the top-plate of the calk-member, and cushioning pads applied to the latter and the heel portions of the shoe, said pads being molded around said tongue and in the space between the top plate of said calk-member and said tongue.

6. A horseshoe, having a bracket projecting rearwardly from its front portion and substantially circular enlargements extending inwardly from its heel portions, a calk-member secured to said bracket, a reinforcing tongue arranged lengthwise of the shoe and connected at its front end to said calk-member and its other end terminating short of said shoe enlargements and disconnected therefrom, and cushioning pads applied to said calk-member and said enlargements and molded about said tongue.

CORA M. SMITH.